United States Patent
Vitello et al.

(10) Patent No.: US 9,257,873 B2
(45) Date of Patent: Feb. 9, 2016

(54) METHOD AND APPARATUS FOR GENERATOR STATOR CORE SEPARATION

(71) Applicants: Travis John Vitello, Oviedo, FL (US); David Thomas Allen, Longwood, FL (US); Benjamin T. Humphries, Orlando, FL (US)

(72) Inventors: Travis John Vitello, Oviedo, FL (US); David Thomas Allen, Longwood, FL (US); Benjamin T. Humphries, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 256 days.

(21) Appl. No.: 13/768,399

(22) Filed: Feb. 15, 2013

(65) Prior Publication Data

US 2014/0230216 A1    Aug. 21, 2014

(51) Int. Cl.
*H02K 1/18* (2006.01)
*H02K 15/00* (2006.01)
*H02K 15/02* (2006.01)

(52) U.S. Cl.
CPC ............ *H02K 1/185* (2013.01); *H02K 15/0006* (2013.01); *H02K 15/024* (2013.01); *Y10T 29/49734* (2015.01); *Y10T 29/49735* (2015.01); *Y10T 29/49815* (2015.01); *Y10T 29/53143* (2015.01); *Y10T 29/53274* (2015.01)

(58) Field of Classification Search
CPC ............. H02K 15/024; H02K 15/0006; Y10T 29/49815; Y10T 29/53274; Y10T 29/53143; Y10T 29/49732; Y10T 29/49734; Y10T 29/49735; Y10T 29/49737; Y10T 29/49011; Y10T 29/49014; Y10T 29/49721; Y10T 29/49822

USPC .......... 29/426.1, 426.5, 596, 402.08, 402.03, 29/402.09, 402.11, 402.12, 402.14, 29/402.17, 598, 732, 762
See application file for complete search history.

(56) References Cited

U.S. PATENT DOCUMENTS

| | | | | |
|---|---|---|---|---|
| 3,531,667 A | * | 9/1970 | Barton et al. | 310/51 |
| 4,327,303 A | * | 4/1982 | Jacobsen | 310/423 |
| 4,425,523 A | * | 1/1984 | Detinko et al. | 310/433 |
| 4,621,850 A | * | 11/1986 | Wiersema et al. | 294/81.61 |
| 4,815,673 A | * | 3/1989 | Wheeler | 198/346.1 |
| 4,894,573 A | * | 1/1990 | Simpson | 310/216.124 |
| 5,090,107 A | * | 2/1992 | Beakes et al. | 29/566.3 |

(Continued)

FOREIGN PATENT DOCUMENTS

| | | | | |
|---|---|---|---|---|
| DE | 19637724 A1 | * | 3/1998 | H02K 15/028 |
| EP | 0690546 A2 | * | 1/1996 | H02K 1/185 |

*Primary Examiner* — Jermie Cozart
*Assistant Examiner* — Bayan Salone

(57) ABSTRACT

An intercoupled stator core is separated from a non-vertically oriented (including horizontal) generator frame by decoupling the stator core and frame coupling members and interposing a slidable member between them. Thereafter they are separated relative to each other on the sliding member. The sliding or slidable member may comprise a rail, or alternatively a roller adapted for rolling contact with one of the opposed stator core or generator structures and an engagement surface in contact with the other structure. A system for separating the stator core from a non-vertically oriented generator frame includes first and second raising end plates adapted coupled to axial ends of the stator core. The end plates project outwardly from the generator frame ends, for coupling to a raise mechanism. After the raise mechanism raises the stator core the slidable member is interposed between the stator core and generator frame.

9 Claims, 6 Drawing Sheets

(56) References Cited

U.S. PATENT DOCUMENTS

| | | | | |
|---|---|---|---|---|
| 5,214,838 A * | 6/1993 | Beakes et al. | | 29/596 |
| 5,783,943 A * | 7/1998 | Mastandrea et al. | | 324/318 |
| 5,806,170 A * | 9/1998 | Noshita et al. | | 29/596 |
| 5,816,367 A * | 10/1998 | Lilja et al. | | 187/244 |
| 5,875,540 A * | 3/1999 | Sargeant et al. | | 29/596 |
| 5,946,793 A * | 9/1999 | Noshita et al. | | 29/596 |
| 6,104,116 A * | 8/2000 | Fuller et al. | | 310/216.124 |
| 6,144,129 A * | 11/2000 | Fuller et al. | | 310/91 |
| 6,201,334 B1 | 3/2001 | Sargeant et al. | | |
| 6,321,439 B1 * | 11/2001 | Berrong et al. | | 29/596 |
| 7,202,587 B2 * | 4/2007 | Sargeant et al. | | 310/418 |
| 7,214,028 B2 * | 5/2007 | Boasso et al. | | 414/812 |
| 7,302,754 B2 * | 12/2007 | Majernik et al. | | 29/729 |
| 7,353,586 B2 * | 4/2008 | Majernik et al. | | 29/596 |
| 7,395,594 B2 * | 7/2008 | Allen et al. | | 29/596 |
| 7,397,163 B2 * | 7/2008 | Cook et al. | | 310/216.051 |
| 7,463,028 B2 * | 12/2008 | Dietz et al. | | 324/318 |
| 7,484,290 B2 * | 2/2009 | Henley | | 29/598 |
| 7,526,853 B2 * | 5/2009 | Schumacher et al. | | 29/596 |
| 7,653,986 B2 * | 2/2010 | Majernik et al. | | 29/732 |
| 7,716,817 B2 * | 5/2010 | Mall et al. | | 29/732 |
| 7,827,676 B2 * | 11/2010 | Allen et al. | | 29/732 |
| 7,854,167 B2 * | 12/2010 | Hashiba et al. | | 73/572 |
| 7,861,404 B2 * | 1/2011 | Fayewicz et al. | | 29/729 |
| 7,946,028 B2 * | 5/2011 | Majernik et al. | | 29/732 |
| 8,082,662 B2 * | 12/2011 | Schroeder et al. | | 29/760 |
| 8,220,138 B2 * | 7/2012 | Majernik et al. | | 29/732 |
| 8,387,235 B2 * | 3/2013 | Pervaiz | | 29/732 |
| 8,714,534 B2 * | 5/2014 | Vitello et al. | | 269/55 |
| 8,789,274 B2 * | 7/2014 | Bywaters et al. | | 29/889.3 |
| 8,813,333 B2 * | 8/2014 | Vitello et al. | | 29/402.08 |
| 2005/0235479 A1 * | 10/2005 | Allen et al. | | 29/596 |
| 2005/0235480 A1 * | 10/2005 | Majernik et al. | | 29/596 |
| 2005/0236926 A1 * | 10/2005 | Majernik et al. | | 310/259 |
| 2007/0207017 A1 * | 9/2007 | Boasso et al. | | 414/434 |
| 2008/0042514 A1 * | 2/2008 | Cook et al. | | 310/258 |
| 2008/0092374 A1 * | 4/2008 | Fayewicz et al. | | 29/729 |
| 2008/0115347 A1 * | 5/2008 | Majernik et al. | | 29/732 |
| 2009/0235516 A1 * | 9/2009 | Notarange et al. | | 29/596 |
| 2009/0255104 A1 * | 10/2009 | Gillivan et al. | | 29/426.1 |
| 2010/0072835 A1 * | 3/2010 | Klatt | | 310/54 |
| 2010/0115762 A1 * | 5/2010 | Majernik et al. | | 29/732 |
| 2010/0154201 A1 * | 6/2010 | Pervaiz | | 29/598 |
| 2011/0214281 A1 * | 9/2011 | Majernik et al. | | 29/732 |
| 2013/0298366 A1 * | 11/2013 | Vitello et el. | | 29/402.08 |
| 2013/0300046 A1 * | 11/2013 | Vitello et al. | | 269/55 |
| 2014/0190001 A1 * | 7/2014 | Jaszcar et al. | | 29/596 |

\* cited by examiner

METHOD AND APPARATUS FOR GENERATOR STATOR CORE SEPARATION

BACKGROUND OF THE INVENTION

1. Field of the Invention

The invention relates to generator stator core removal, and more particularly to field removal and reinstallation of assembled stator cores from non-vertically oriented generator frames, including horizontally-oriented generator frames.

2. Description of the Prior Art

During a generator major overhaul stator cores are removed from the generator frame. Old core windings and insulation are stripped from the stator core lamina stack and replaced with new ones. The replacement stator core is assembled within the generator frame. Generally the overhaul is performed at the power generation site, rather than transporting the entire generator to an offsite repair facility.

Some generator designs facilitate removal of their entire stator core assembly as a module by orienting the core axis in a vertical position and lifting the core module with a crane or other hoisting device that is coupled to a lifting plate affixed to an axial end of the stator core. When vertically lifting an entire stator core module care must be taken to avoid damaging either the core or the generator frame by inadvertent contact during lifting. Given the relatively large diameter, axial length and weight of a stator core, and the relatively small radial clearance with the generator frame a small yaw of the stator core during the hoisting operation may cause inadvertent impacts. Cranes, hoists and similar heavy moving equipment are expensive to purchase or lease, require logistic planning to have them available on a job site and skilled operating engineers, thus often necessitating retention of specialized subcontractors to complete the generator refurbishment. It is desirable to minimize the number of subcontractors needed to refurbish a generator, as well as minimize likelihood of generator damage that might result from impacts incurred during vertical stator core hoisting.

Other generator designs are not suitable for vertically lifting stator cores prior to their refurbishment. In those generator designs the stator core is disassembled in place by hand. Service personnel serially and repetitively remove layers of core windings, insulation and individual core lamina (often up to 75000 individual laminations) in the lamina stack with hand-held tools while the generator frame is oriented with its rotor rotational axis in a vertical or horizontal position (analogous to an archaeological excavation). Such hand labor is time consuming and expensive. A typical in-place rotor core disassembly within the generator frame requires 3-8 days' work by a service crew to remove layers of lamina, windings and insulation. Core disassembly external to the generator consumes less service time, and allows quicker generator service resumption.

SUMMARY OF THE INVENTION

Accordingly, an object of the invention is to remove a stator core from a generator as a module without vertically hoisting the core, so as to eliminate the need for cranes or other heavy hoisting equipment.

Another object of the invention is to remove a stator core from a generator as a module without vertically hoisting the core, so as to minimize likelihood of generator damage arising from inadvertent contact of the stator core and generator frame.

An additional object of the invention is to minimize hand labor required to remove a stator core from a generator, and specifically to avoid full core disassembly in place with hand labor.

These and other objects are achieved in accordance with the present invention by a method for separating an intercoupled stator core from a non-vertically oriented generator frame. The method features decoupling respective coupled stator core and frame coupling members. After the decoupling at least one sliding member is interposed between the stator core and frame. Thereafter the respective stator core and frame are slidably separated relative to each other on the at least one sliding member, so that they are separated from their initially coupled relative positions. The method of this invention avoids the need to hoist the stator core vertically out of the generator frame, or the need to disassemble the core in its entirety by hand.

The present invention also features an apparatus for separating a stator core having a first coupling member relative to a non-vertically oriented generator frame having a second coupling member in engagement with the first coupling member. The apparatus comprises a slidable member adapted for interposition between the disengaged stator core and generator frame. The slidable member enables relative sliding motion between the stator core and generator frame. In some embodiments the slidable member comprises a rail having a first surface for slidable engagement with one of the coupling members. In other embodiments the rail further comprises a second slidable surface for slidable engagement with the other of the coupling members. In yet other embodiments the slidable member comprises a roller adapted for rolling contact with one of the opposed stator core or generator structures and an engagement surface adapted for contact with the other structure. Interposition of a slidable member between the stator core and frame while the generator is oriented in a non-vertical position avoids inadvertent impact of the stator core and generator frame during their separation.

Other embodiments of the present invention feature a system for separating a stator core having axial ends and a first coupling member relative to a non-vertically oriented generator frame having axial ends and a second coupling member in engagement with the first coupling member. The system includes first and second raising end plates adapted for coupling to respective axial ends of a stator core. The end plates are adapted for projecting axially outwardly from respective axial ends of the generator frame, for coupling to a raise mechanism and thereafter separating the first and second coupling members when the raise mechanism raises stator core. The system also includes a slidable member adapted for interposition between the stator core and generator frame. The slidable member enables relative sliding motion between the stator core and generator frame. The invention system avoids the need to utilize cranes or other hoisting heavy equipment and avoids inadvertent impact of the stator core and generator frame during their separation.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in separation of stator cores from generator frames by orienting them in a non-vertical position, separating them radially, such as with a lifting jack or other lifting device, and interposing at least slidable member between them. Thereafter the stator core is separated axially relative to the generator frame by sliding it on the slidable member(s). In this manner cranes or other hoisting heavy equipment is not needed to separate the stator core from the generator frame, and likelihood of inadvertent damage caused by stator core/generator frame contact is avoided. By removing the stator core as a module extensive hand labor is avoided as compared to that needed to remove portions of the core while still in the generator frame.

Figure 1:
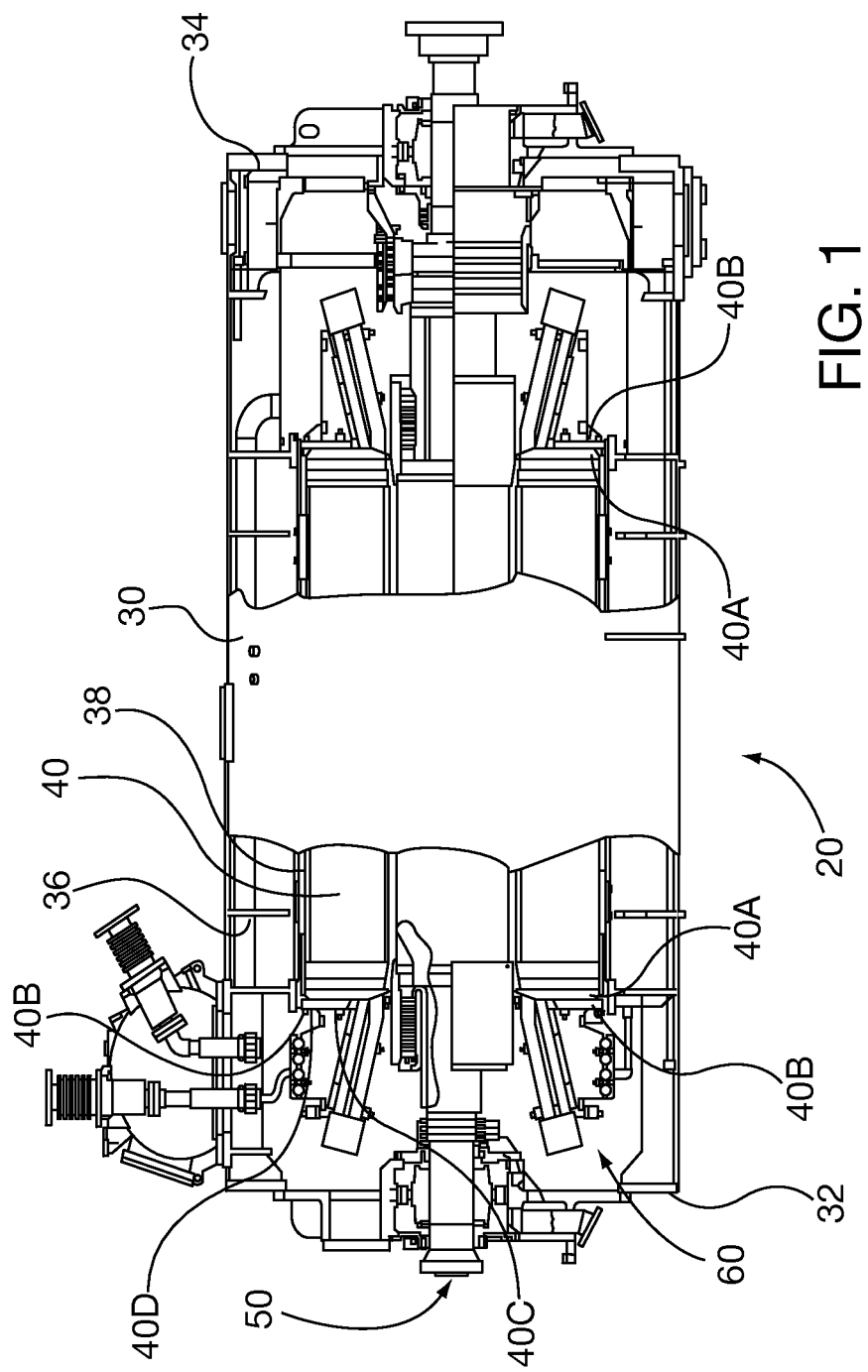
FIG. 1 shows an axial cross section of a horizontal, non-vertically oriented generator, including a generator frame and a separable stator core.
Figure 2:
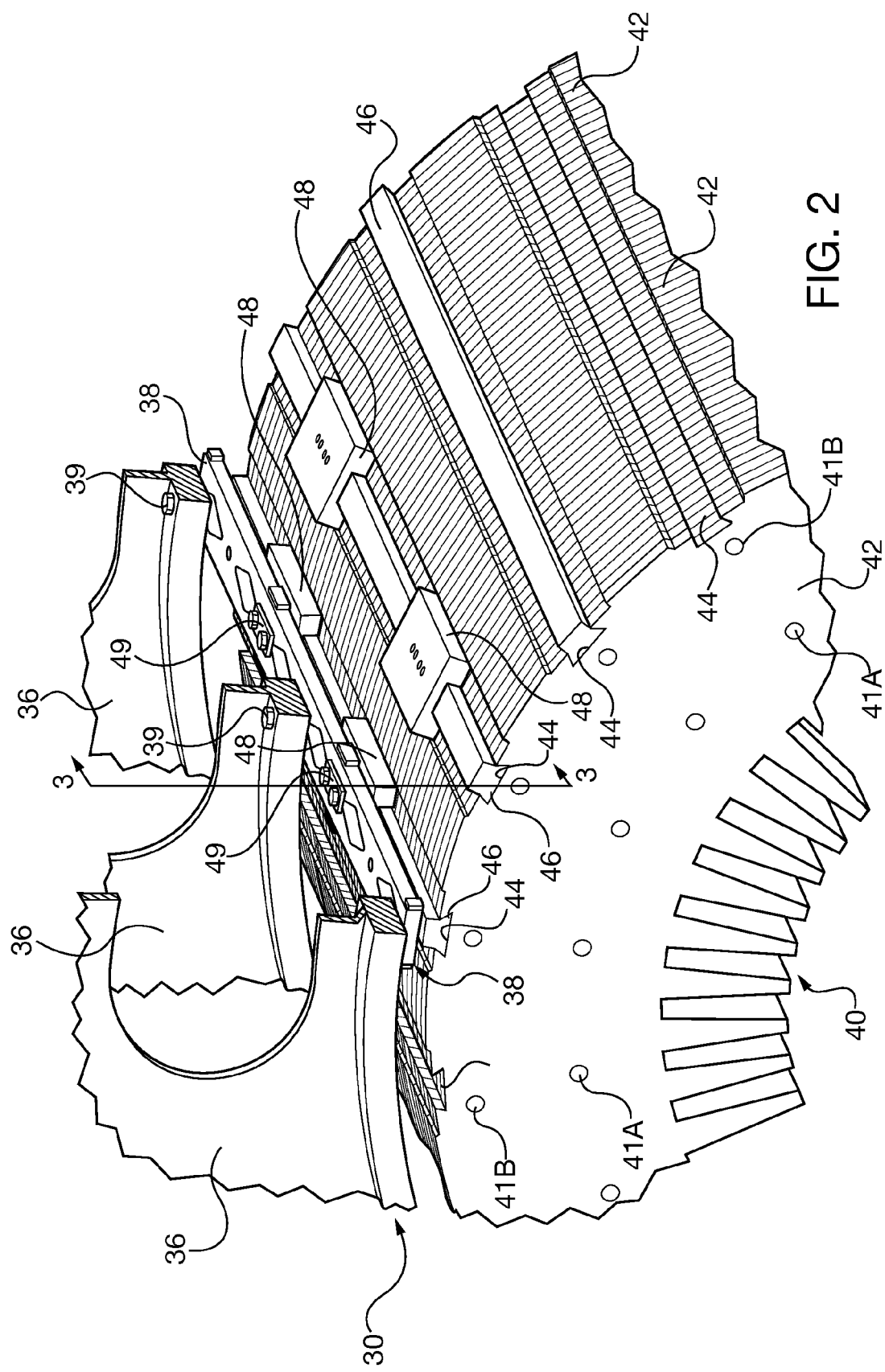
FIG. 2 shows a perspective fragmented view of a stator core and generator frame, including coupling members that retain them relative to each other.
Figure 3:
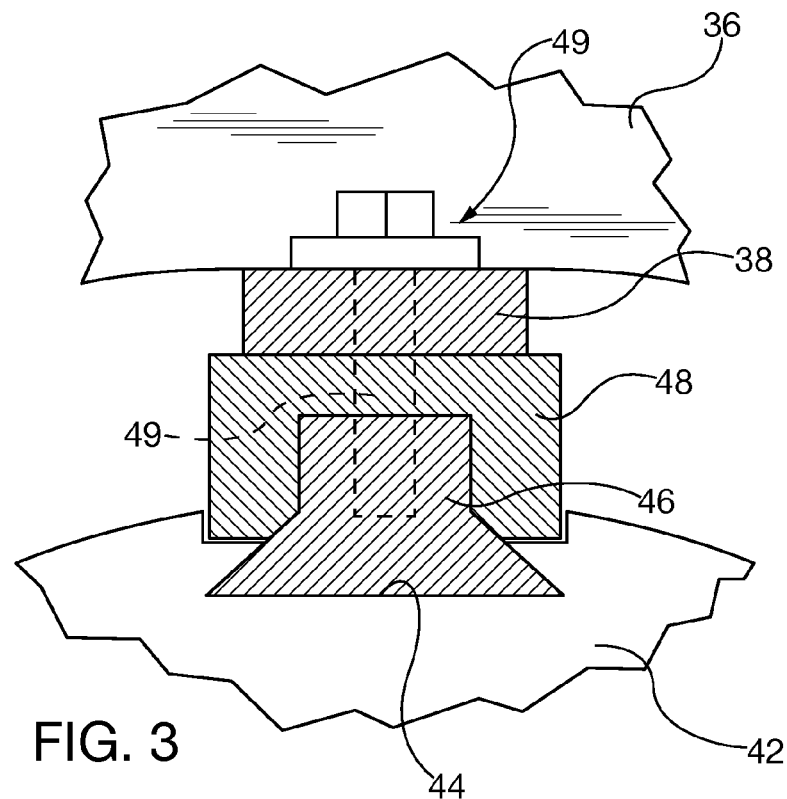
FIG. 3 is a radial cross sectional view of stator core and generator frame coupling members, taken along 3-3 of FIG. 2.
Figure 4:
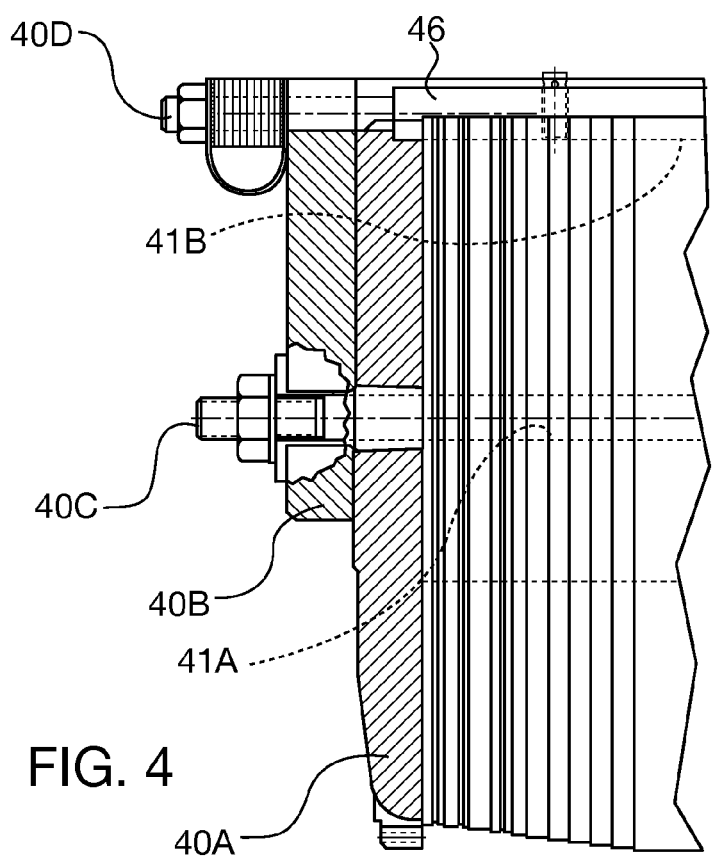
FIG. 4 is a partial fragmentary elevational view of the generator stator core of FIG. 1, showing stator core end plates.
Figure 5:
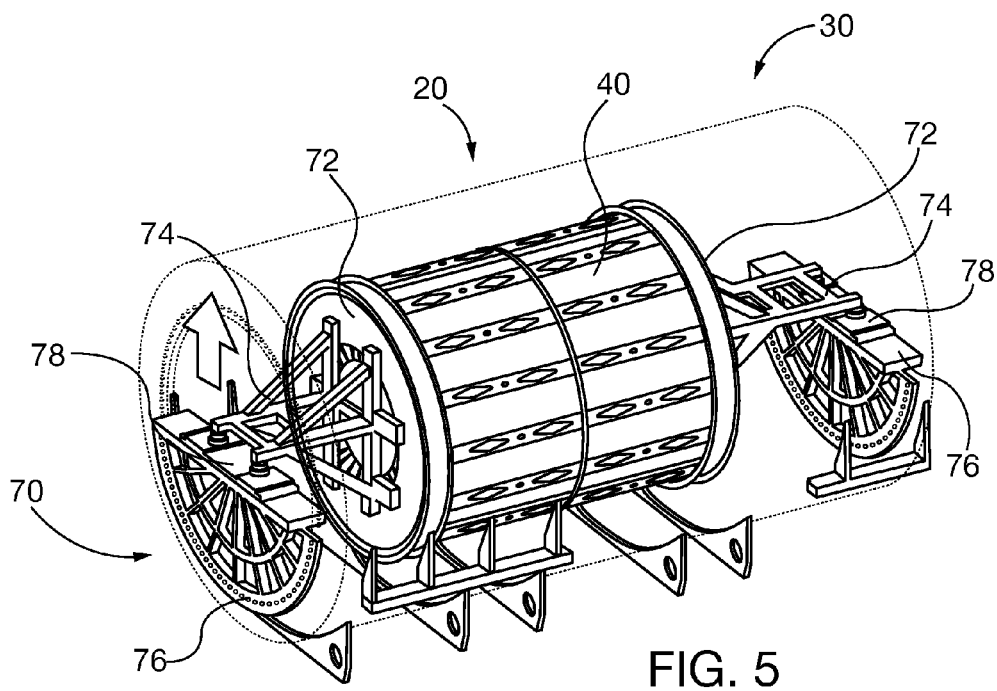
FIG. 5 is a perspective view of the generator of claim 1 with raising end plates and a raise mechanism installed on the stator core, for raising the stator core relative to the generator frame.
Figure 6:
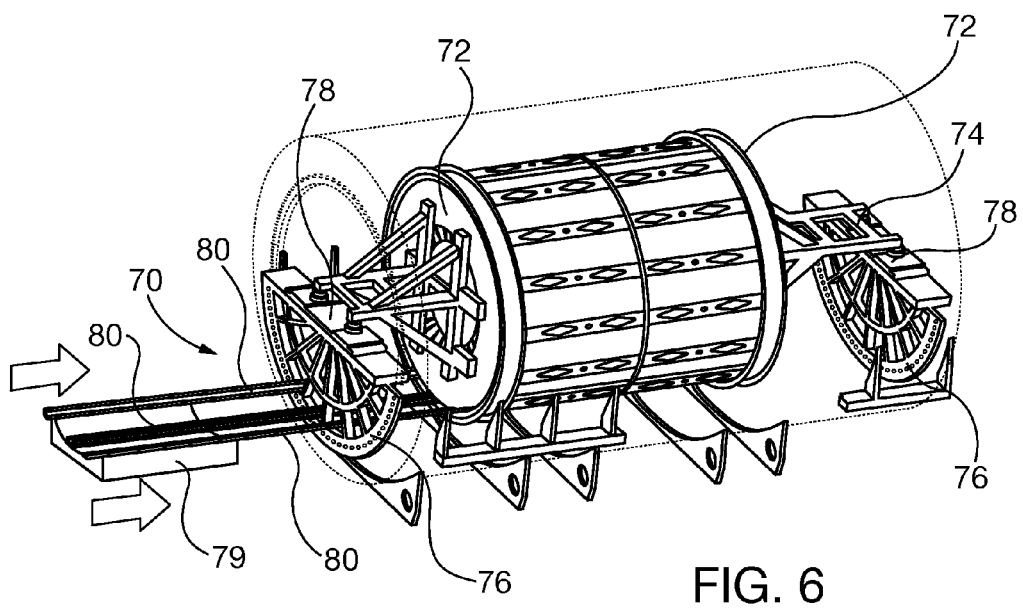
FIG. 6 is a perspective view the generator of claim 1 with raising end plates after interposition of slidable member rails between the separated stator core and generator frame.

Referring to FIGS. 1-3, generator 20 is oriented in a horizontal position, and has a generator frame 30 with an exciter axial 32 and a turbine exciter axial end 34. The generator 20 can also be oriented in other non-vertical positions at an inclined angle relative to the power plant floor. The generator frame 30 has a circumferential frame support 36 and a plurality of axially oriented frame coupling members, shown as spring bars 38, which are affixed to the frame supports 36 by spring bar fasteners 39. The generator 20 has a stator core 40 with axial ends terminating in stator core finger plates 40A and stator core end plates 40B. Stator core through bolts 40C and building bolts 40D axially retain the stack of stator laminas 42. The stator core 30 defines a plurality of circumferential, axially aligned key slots 44 that retain stator core coupling member key bars 46. The key bars 46 are coupled to respective spring bars 38 in radially spaced relationship by key blocks 48. The key bars 46 and spring bars 38 are coupled together by coupling fasteners and plates 49. Rotor 50 is rotatively mounted concentric with the bore formed within the stator core 30. The stator core retains core windings that terminate in stator end windings 60 at each axial end of the stator. Before stator core 40 services, the generator 20 is preferably positioned horizontally in an area of the power generation facility where a repair crew has sufficient space to perform repairs. Often this will entail elevating the generator 20 from a generator pit to the industrial gas turbine service deck level by installing lift trunions on the generator frame 30 exterior and jacking the entire generator under the lift trunions.

FIGS. 5-8 show a first exemplary embodiment of a stator core separation system 70, for separating a stator core 40 from its generator frame 30 while both are oriented in a non-vertical (preferably horizontal) position, and method for separating the stator core and generator frame. The rotor 50 and associated bearing brackets are removed from the generator frame 30 using known methods. Stator core end windings 60 are removed by hand from the turbine and exciter ends of the stator core 40, exposing the respective stator core finger plates 40A, end plates 40B, through bolts 40C and building bolts 40D. The stator core 40 and generator frame 30 are decoupled, (e.g., by physically unfastening the generator frame spring bar coupling members 38 from the stator core key bar coupling members 46 and removing non-weight bearing key blocks 48). Stator core end raising plates 72 are affixed to the turbine and exciter ends of the stator core 40, such as by coupling to the through bolts 40C (with or without through bolt extensions). The end raising plates 72 have raising plate extensions 74 that project outwardly from the axial ends of the generator frame 30. Frame end plates 76 are affixed to each of the exciter and turbine axial ends 32, 34 of the generator frame 30. A raising mechanism 78, such as a hydraulic jack, is interposed between the respective paired stator end raising plate extensions 74 and the frame end plates 76. The raising mechanism 78 is raised; separating the stator core 40 and generator frame 30 radially, so that there is a spaced gap with no weight-bearing physical contact between them. At least one sliding member is interposed in the gap between the generator frame 30 and stator core 40.

Figure 7:
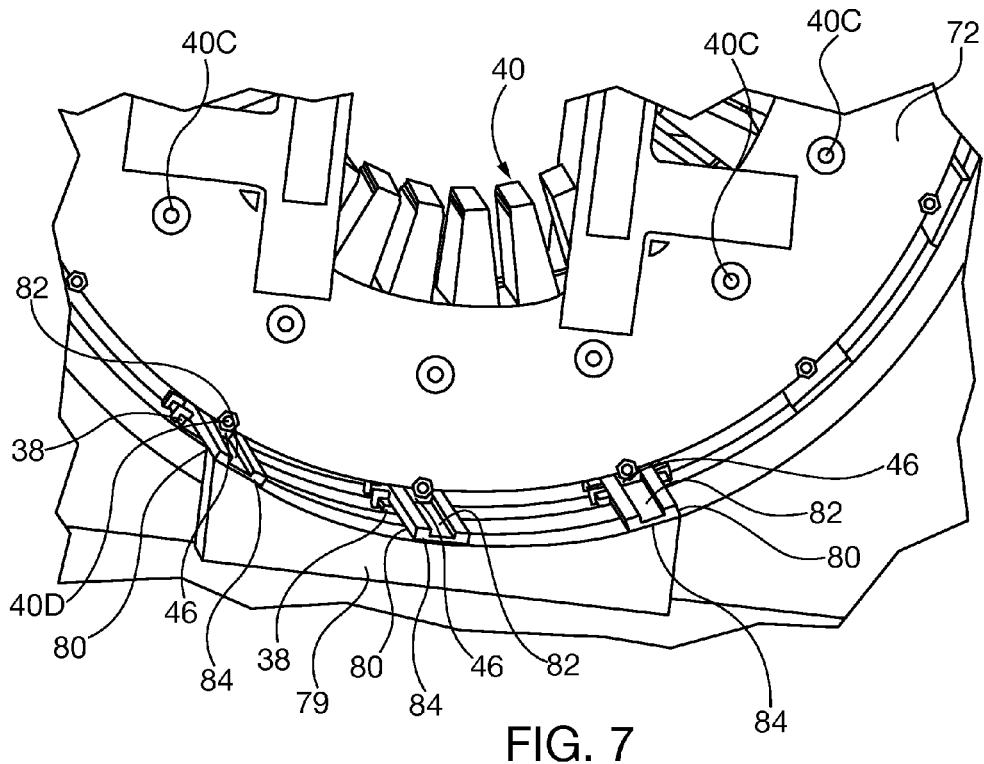
FIG. 7 is a detailed elevational perspective view showing the stator core resting on the slidable member rails, so that the core may be slidably removed from the generator frame.
Figure 8:
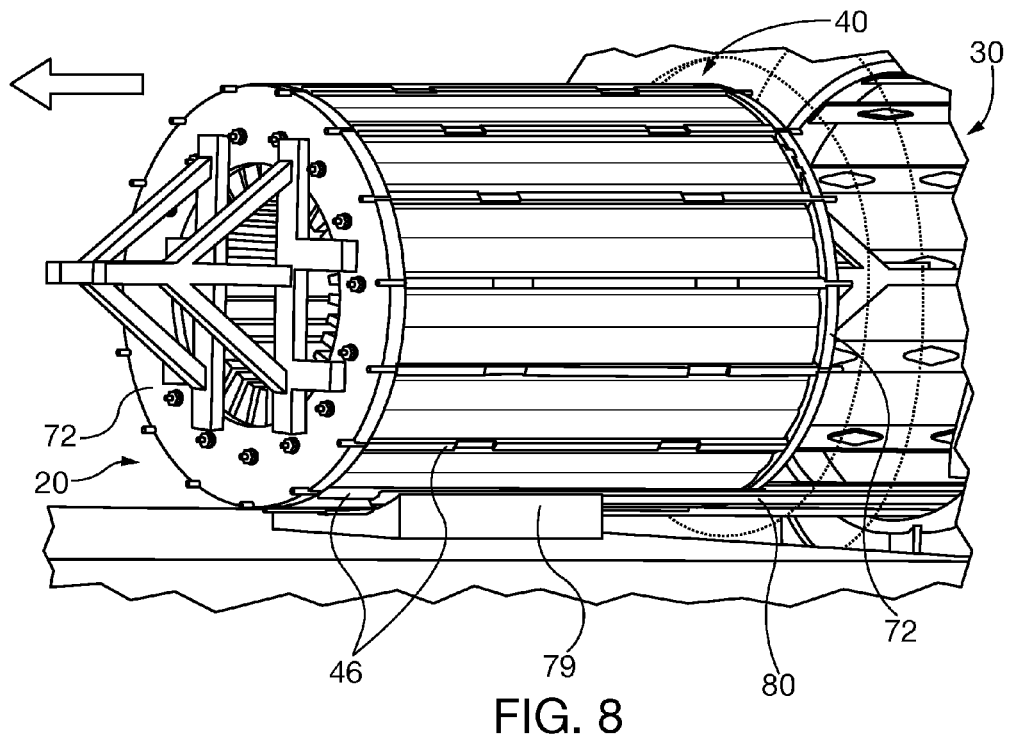
FIG. 8 is perspective view similar to FIG. 6, after the stator core is slidably separated from the generator frame and resting on the slidable member rails of FIG. 7.

In the embodiment of FIGS. 5-8 the sliding member comprises at least one and preferably a plurality of rails 80 resting on the generator frame 30 and extending out of the frame, where they rest on rail support 79. In this manner the rails 80 are also placed under the stator core 40. The raising mechanisms 78 on each end of the generator 20 are lowered, with the stator core 40 now resting on the rails 80. Thereafter the raising mechanisms 78 and at least the frame end plate 76 that is proximal the rail support 79 are removed, so that the stator core 40 in its entirety as a modular unit may be axially separated from the generator frame 30 by sliding it on the rails 80. As shown in FIG. 7, the sliding member embodiment rails 80 are interposed between the axially supportive respective coupling members: the stator core key bars 46 and generator frame spring bars 38. The rail 80 has a key bar sliding surface 82, which as shown is a channel formed in the rail for slidable receipt of the key bar 46. The rail also has a spring bar sliding surface 84 that mates with the spring bar 38.

Figure 9:
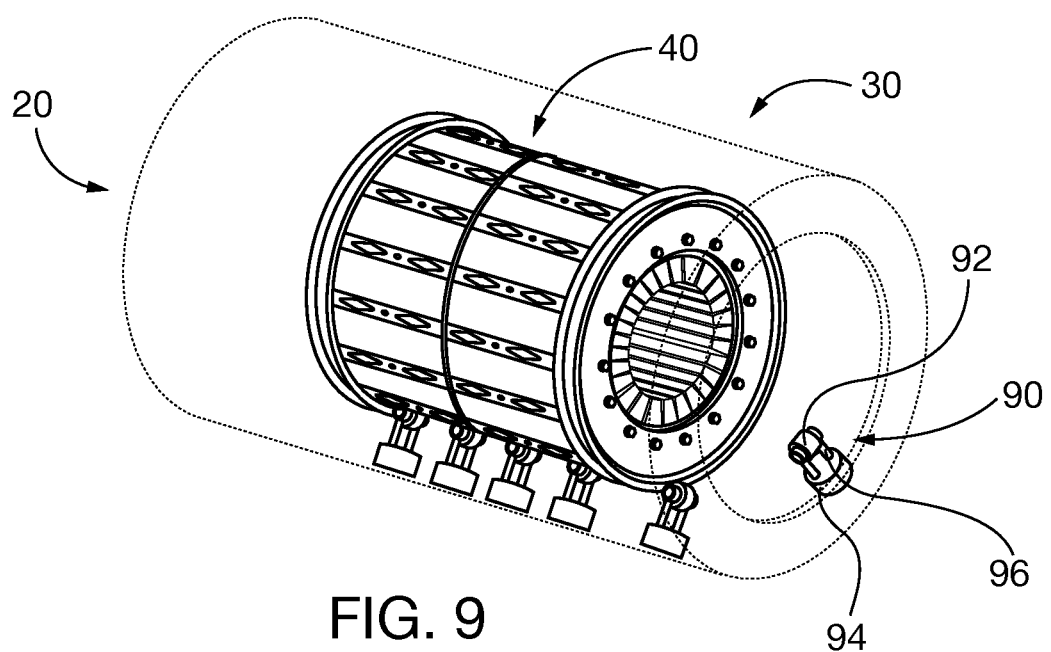
FIG. 9 is a perspective view of an alternate embodiment slidable member, including rollers.
Figure 10:
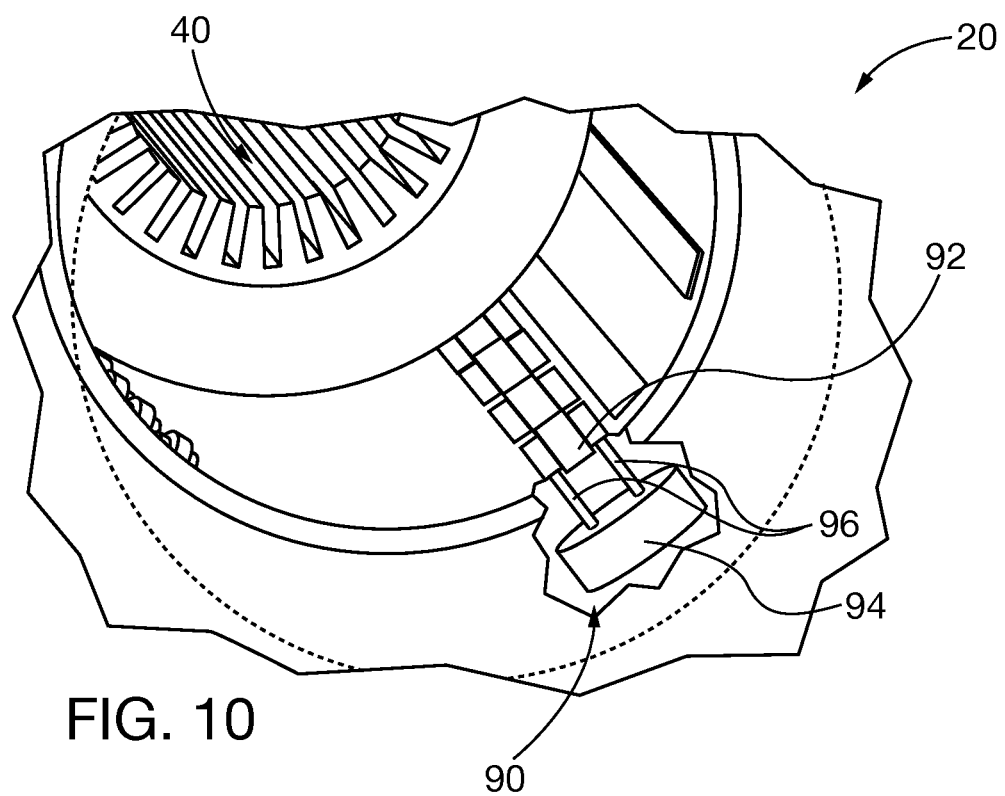
FIG. 10 is a detailed elevational perspective view showing the stator core resting on the slidable member rollers of FIG. 9, so that the core may be slidably removed from the generator frame.

An alternate exemplary embodiment of a stator core separation system is shown in FIGS. 9 and 10. The sliding or slidable member comprises a roller assembly 90, and preferably an array of roller assemblies aligned axially and interposed between the generator frame 30 and stator core 40, such as at the 5 o'clock and 7 o'clock circumferential positions within the generator frame 30, between parallel rows of spring bars 38. In this manner the entire decoupled modular stator core 40 may be separated axially from the generator frame 30 by sliding the stator core on the roller assemblies. Each roller assembly comprises a roller 92, for abutment against the stator core 40 outer circumference and an engagement surface 94 distal the roller 92, for engagement with the generator frame 30. The engagement surface 92 may mate with a complimentary engagement surface formed in a removable fixture that is inserted as part of the stator core 40 separation procedures. Alternatively a complimentary engagement surface can be permanently installed in the generator frame.

The roller assembly 90 preferably comprises a height adjustment mechanism 96, such as a fluid jack, screw jack, or adjustable shim stack, which facilitates selective relative radial adjustment between the generator frame 30 and stator core 40. Advantageously if the height adjustment mechanism 96 is a lift mechanism or jack, it can be utilized to raise the stator core 40 away from the generator frame 30 without the need for end raising plates 72/raising plate extensions 74, frame end plates 76 or external raising mechanisms 78 that were described in connection with the previous embodiment of FIGS. 5-8. Elimination of the raising system components allows the stator core 40 to be separated from the generator frame 30 without removing the stator core end windings 60, because there is no need to install end lifting plates 72 on the axial ends of the stator core. However, if desired those raising system components can also be utilized with the roller assemblies 90 of the present invention. Once the stator core 40 is supported by the roller assemblies 90, it can be slid in the axial direction to the exterior of the generator frame 30, transferred to a known sling and hoist assembly or other core transport system, and transported to a repair area for refurbishment.

Either stator core separation system embodiment may also be utilized to install a stator core 40 into a generator frame 30. In this manner, a stator core 40 can be removed or installed in a generator 20 as a modular structure, without a need to perform core assembly or disassembly by hand within the confined space of the generator frame 30.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for separating an intercoupled assembled stator core from a non-vertically oriented generator frame, comprising:
    providing a generator, which includes an assembled stator core having a lamina stack of individual laminations that are retained in compressed axial and radial alignment by an opposed pair of stator core end plates and axially oriented bolts that are coupled to the respective end plates; a generator frame that circumscribes the assembled stator core; and coupling members for coupling the assembled stator core and frame;
    decoupling respective coupled stator core and frame coupling members;
    interposing at least one sliding member between the stator core and frame; and
    sliding the respective assembled stator core and frame relative to each other on the at least one sliding member, without removing individual laminations from the assembled stator core lamina stack, so that they are separated from their initially coupled relative positions.

2. The method of claim 1, the decoupling step comprising decoupling stator core key bars from generator frame spring bars.

3. The method of claim 1, the interposing step comprising radially separating the stator core and frame coupling members before inserting the at least one sliding member.

4. The method of claim 3, the separating step comprising elevating the stator core relative to the frame.

5. The method of claim 4, comprising performing the interposing and sliding steps with at least one sliding member selected from the group consisting of rails and rollers.

6. The method of claim 4, the decoupling step comprising decoupling stator core key bars from generator frame spring bars prior to the elevating step.

7. A method separating an intercoupled stator core from a non-vertically oriented generator frame, comprising:
    decoupling respective coupled stator core key bars from generator frame spring bars;
    elevating the stator core relative to the frame, radially separating the respective stator core key bars and frame spring bars;
    interposing at least one rail sliding member between the respective radially separated rotor core key bars and frame spring bars; and
    sliding the respective stator core and frame relative to each other on the at least one rail sliding member, so that they are separated from their initially coupled relative positions.

8. A method for separating an intercoupled stator core from a non-vertically oriented generator frame, comprising:
    decoupling respective coupled stator core and frame coupling members;
    attaching raising end plates to respective axial ends of the stator core, the end plates projecting axially outwardly from respective axial ends of the generator frame;
    elevating the raising end plates externally relative to the frame, thereby radially separating the respective stator core and frame;
    interposing at least one sliding member between the stator core and frame; and
    sliding the respective stator core and frame relative to each other on the at least one sliding member, so that they are separated from their initially coupled relative positions.

9. The method of claim 8, comprising performing the interposing and sliding steps with at least one sliding member selected from the group consisting of rails and rollers.

* * * * *